United States Patent
Yang

(10) Patent No.: US 11,529,889 B2
(45) Date of Patent: Dec. 20, 2022

(54) BATTERY COOLING SYSTEM FOR VEHICLE AND METHOD THEREOF

(71) Applicants: HYUNDAI MOTOR COMPANY, Seoul (KR); KIA MOTORS CORPORATION, Seoul (KR)

(72) Inventor: Dong Il Yang, Gwangmyeong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 106 days.

(21) Appl. No.: 17/106,432

(22) Filed: Nov. 30, 2020

(65) Prior Publication Data

US 2021/0387547 A1    Dec. 16, 2021

(30) Foreign Application Priority Data

Jun. 15, 2020 (KR) .................. 10-2020-0072501

(51) Int. Cl.
| | |
|---|---|
| *B60H 1/32* | (2006.01) |
| *B60L 58/26* | (2019.01) |
| *H01M 10/625* | (2014.01) |
| *B60H 1/00* | (2006.01) |
| *B60K 1/00* | (2006.01) |

(52) U.S. Cl.
CPC .......... *B60L 58/26* (2019.02); *B60H 1/00278* (2013.01); *H01M 10/625* (2015.04); *B60H 2001/00307* (2013.01); *B60K 2001/005* (2013.01)

(58) Field of Classification Search
CPC ............ B60L 58/26; B60K 2001/005; H01M 10/625; B60H 1/00278; B60H 2001/00307
USPC ......................................................... 62/239
See application file for complete search history.

(56) References Cited

U.S. PATENT DOCUMENTS

| | | | |
|---|---|---|---|
| 2013/0166119 A1* | 6/2013 | Kummer ............. | H01M 10/625 701/22 |
| 2013/0175022 A1* | 7/2013 | King ....................... | B60L 50/62 237/12.3 B |
| 2016/0248129 A1* | 8/2016 | Dunham ............. | H01M 10/625 |
| 2020/0269659 A1 | 8/2020 | Norden | |

FOREIGN PATENT DOCUMENTS

KR    10-2018-0094014 A    8/2018

* cited by examiner

*Primary Examiner* — Davis D Hwu
(74) *Attorney, Agent, or Firm* — Lempia Summerfield Katz LLC

(57) ABSTRACT

A battery cooling system for a vehicle and a method are disclosed. In particular, the battery cooling system may include: a battery cooling apparatus to selectively connected to a cooling apparatus and cool a battery by coolant flowing through the battery cooling apparatus; a battery management system to measure a temperature of the battery in a periodic time interval after a vehicle is turned off; and a controller to control the battery cooling apparatus to cool the battery when the temperature of the batter is higher than a threshold temperature.

4 Claims, 4 Drawing Sheets

BATTERY COOLING SYSTEM FOR VEHICLE AND METHOD THEREOF

CROSS-REFERENCE TO RELATED APPLICATION

This application claims priority to and the benefit of Korean Patent Application No. 10-2020-0072501, filed on Jun. 15, 2020, the entire contents of which are incorporated herein by reference.

FIELD

The present disclosure relates to a battery cooling system for a vehicle and a method thereof. More particularly, the present disclosure relates to a battery cooling system and a method that can prevent a battery from being degraded.

BACKGROUND

The statements in this section merely provide background information related to the present disclosure and may not constitute prior art.

An electric vehicle uses a battery-powered motor operating by electrical energy output by a battery. Since the electric vehicle mainly uses a battery formed of one battery pack including a plurality of rechargeable/dischargeable secondary cells, there are merits in that it has no emission gases and low noise.

A hybrid vehicle commonly refers to a gasoline-electric hybrid vehicle that uses gasoline to power an internal-combustion engine and an electric battery to power an electric motor.

As such, since performance of an electric vehicle depends on performance of a battery, it needs a battery management system that can manage charge and discharge of each battery cell, and that can guarantee performance of the battery cell.

Particularly, the battery used for the electric vehicle is degraded essentially by continuous usage, and therefore performance of the battery is deteriorated. If the performance of the battery is deteriorated, travel distance is reduced and output of the vehicle during acceleration under same state of charge (SOC) is degraded.

The above information disclosed in this Background section is only for enhancement of understanding of the background of the present disclosure, and therefore it may contain information that does not form the prior art that is already known to a person of ordinary skill in the art.

SUMMARY

The present disclosure provides a battery cooling system for an electric vehicle and a method thereof that can prevent degradation of a battery provided in an electric vehicle.

In an exemplary form of the present disclosure, a battery cooling system may include: a battery cooling apparatus configured to selectively connected to a cooling apparatus and cool a battery; the battery in which coolant flowing through the battery cooling apparatus is circulated therein; a battery management system configured to measure a temperature of the battery in a periodic time interval after a vehicle is turned off; and a controller configured to cool the battery through the battery cooling apparatus when the temperature of the batter is higher than a threshold temperature.

The battery cooling apparatus may include a battery cooling line in which coolant flows; a chiller provided on the battery cooling line, and adjusting a temperature of the coolant through heat-exchanging with the coolant selectively flowing therein; a first valve selectively connecting the cooling line of the cooling apparatus to the battery cooling line between the radiator and the battery; a branch line connecting the chiller and the battery through the first valve; and an electric water pump provided on the battery cooling line, and pumping the coolant flowing through the battery cooling line.

When the temperature of the battery is higher than the threshold temperature, the controller may operate the first valve to connect the battery connecting line and the branch line, close the cooling line and the battery connecting line, and operate the chiller and the electric water pump.

When the temperature of the battery is less than a predetermined temperature lower than the threshold temperature, the controller may stop an operation of the battery cooling apparatus, and the battery management system may measure the temperature of the battery in a periodic time interval.

In another exemplary form of the present disclosure, a cooling method for a vehicle may include: measuring, by a battery management system, a temperature of a battery in a periodic time interval; and cooling, by a controller, the battery through a battery cooling apparatus selectively connected to a cooling apparatus when the temperature of the battery measured by the battery management system is higher than a threshold temperature.

When the temperature of the battery is higher than the threshold temperature, a branch line connecting a chiller of the battery cooling apparatus chiller and a battery connecting line of the battery cooling apparatus may be connected by an operation of a valve controlled by the controller, and the battery cooling line of the battery cooling apparatus and a cooling line of the cooling apparatus may be closed by the controller, and the battery may be cooled by the chiller.

When temperature of the battery is less than a predetermined temperature lower than the threshold temperature, an operation of the battery cooling apparatus may be stopped by the controller, and the temperature of the battery may be measured in a periodic time interval by the battery management system.

According to an exemplary form of the present disclosure, when the vehicle is left for a long time in a hot weather and the temperature of the battery 130 is increased, the battery is cooled by an operation of the battery cooling apparatus and the air-conditioning system, and it is possible to prevent the battery from being degraded.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
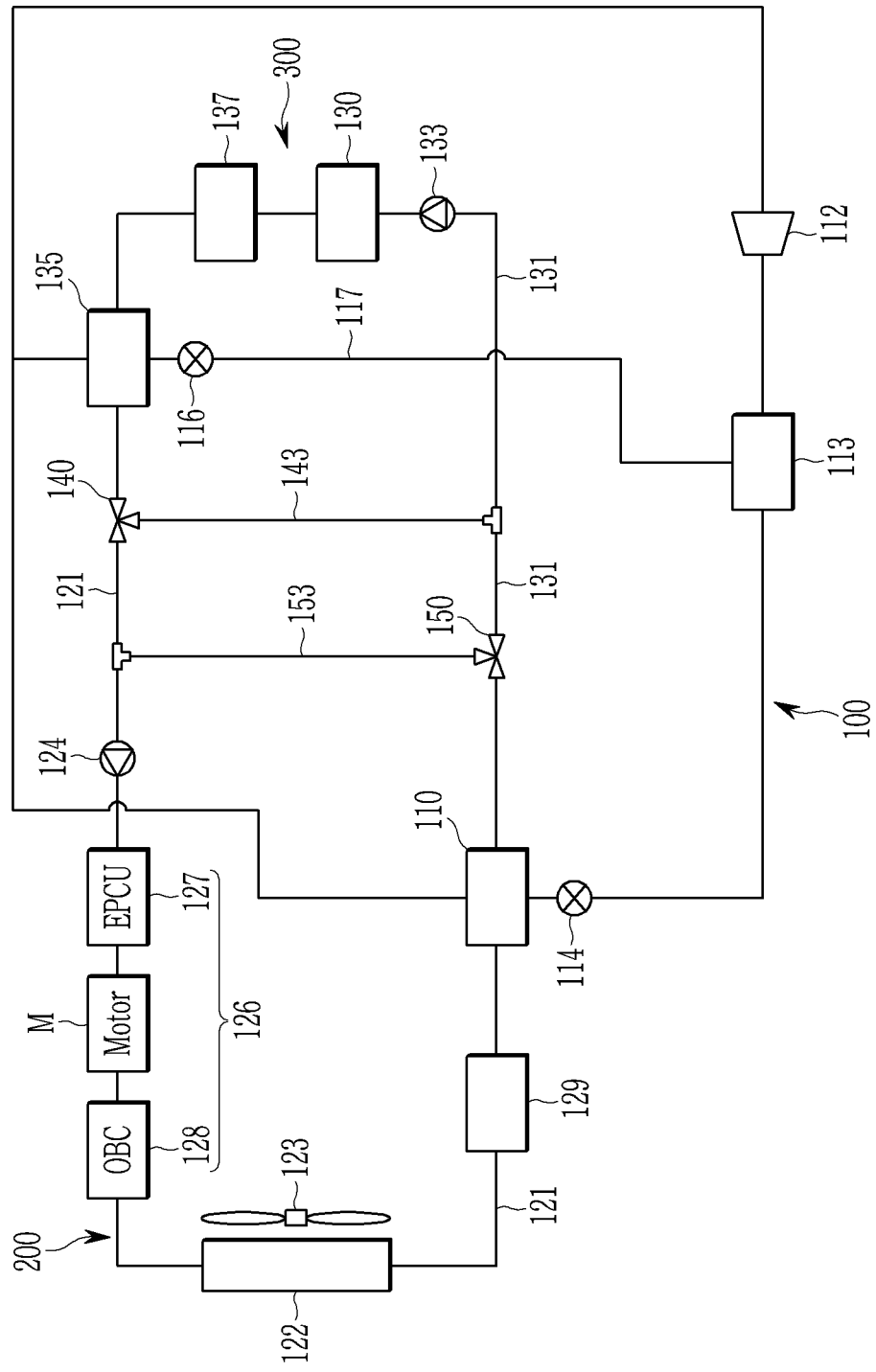
FIG. 1 is a block diagram illustrating a battery cooling system for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

In describing the present disclosure, parts that are not related to the description will be omitted. Like reference numerals generally designate like elements throughout the specification.

In addition, the size and thickness of each configuration shown in the drawings are arbitrarily shown for better understanding and ease of description, but the present disclosure is not limited thereto. In the drawings, the thickness of layers, films, panels, regions, etc., are exaggerated for clarity.

It is understood that the term "vehicle" or "vehicular" or other similar term as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example both gasoline-powered and electric-powered vehicles.

Additionally, it is understood that some of the methods may be executed by at least one controller. The term "controller" refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Hereinafter, a battery cooling system for a vehicle according to an exemplary form of the present disclosure will be described in detail with reference to accompanying drawings.

Figure 2:
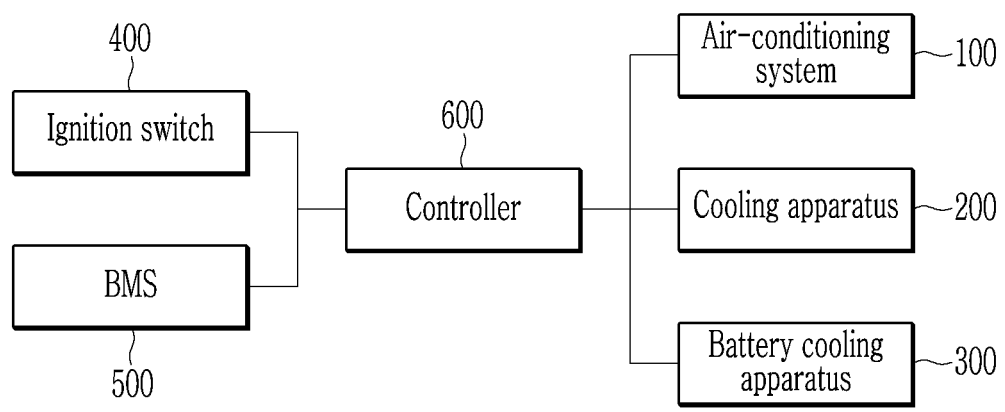
FIG. 2 is a block diagram illustrating a battery cooling system for a vehicle according to another exemplary form of the present disclosure.

FIG. 1 is a block diagram illustrating a battery cooling system for a vehicle according to an exemplary form of the present disclosure. FIG. 2 is a block diagram illustrating a battery cooling system for a vehicle according to another exemplary form of the present disclosure.

As shown in FIG. 1 and FIG. 2, the battery cooling system may include an air-conditioning system 100 for cooling or heating the interior of the vehicle, a cooling apparatus 200 for cooling a motor 125 and an electric component 126, and a battery cooling apparatus 300 for cooling or heating a battery 130.

The battery cooling apparatus 300 may interact with the air-conditioning system 100 and the cooling apparatus 200.

The air-conditioning system 100 may cool down the interior of the vehicle through circulation of a refrigerant during a vehicle cooling mode. The air-conditioning system 100 may include a compressor 112, a condenser 113, an evaporator 115, and a first expansion valve 114 connected through refrigerant lines with each other.

The cooling apparatus 200 includes a motor 125 and an electric component 126 provided in a cooling line 121 in which coolant flows, a radiator 122, a first electric water pump 124, and a reservoir tank 129, and circulates coolant to cool the motor 125 and the electric component 126.

The electric component 126 includes an electric power control unit (EPCU) provided on a cooling line 121 between the motor 125 and the first electric water pump 124, and an on-board charger (OBC) provided on the cooling line 121 between the motor and the radiator 122.

The radiator 122 is provided in a front side of the vehicle, and a cooling fan is provided in a rear side of the vehicle such that coolant is cooled by operation with the cooling fan and heat exchange with an outside air.

The motor 125 and the electric component 126 may be disposed in series on the cooling line 121 between the radiator 122 and the first electric water pump 124.

The cooling apparatus 200 configured as above circulates the coolant cooled in the radiator 122 through the cooling line 121 by operation of the first electric water pump 124 so as to cool down the motor 125 and the electric component 126.

The battery cooling apparatus 300 may include a battery cooling line 131, a battery 130 disposed on the battery cooling line 131, a chiller 135, a second electric water pump 133 and heater 137.

The battery 130 supplies power to the motor 125 and the electric component 126. The battery 130 is connected with the cooling apparatus 200 through the cooling line 121 and the battery cooling line 131, and coolant may be circulated in the battery 130 through an operation of the second electric water pump 133.

The chiller 135 is connected to the connecting line 117 through the refrigerant line of the air-conditioning system 100, is provided on the battery cooling line 131, and controls a temperature of the coolant by heat-exchanging the coolant and the refrigerant flowing therein.

A second expansion valve 116 may be provided on the connecting line 117 between the condenser 113 and the chiller 135. The second expansion valve 116 may be operated when the battery 130 is cooled by refrigerant. Such a second expansion valve 116 expands the refrigerant introduced through the connection line 117 to introduce the refrigerant in a lower temperature state to the chiller 135.

That is, the second expansion valve 116 expands the condensed refrigerant discharged from the condenser 113 to lower the temperature of the refrigerant and introduces the low-temperature refrigerant to the chiller 135 such that a temperature of the coolant passing through the inside of the chiller 135 can be further decreased. Accordingly, the coolant of which the temperature is decreased while passing through the chiller 135 is introduced into the battery 130 such that the battery 130 can be more efficiently cooled down.

The heater 137 is provided on the battery cooling line 131 between the battery 130 and the chiller 135. When temperature increase of the battery 130 is desired, the heater 137 is turned-on to heat the coolant circulated along the battery cooling lines 131 thereby making it possible to introduce the coolant of which a temperature is raised into the battery 130.

A first valve 140, which selectively connects the cooling line 121 and the battery cooling line 131, is provided on the battery cooling line 131 between the radiator 122 and the chiller 135.

The battery cooling line 131 may include a first branch line 143 to connect respective the battery cooling lines 131 with each other between the chiller 135 and the battery 130 through the first valve 140.

When increasing a temperature of the battery 130 or cooling the battery 130 using the coolant heat-exchanged with the refrigerant, the first valve 140 may open the first branch line 143, and may close connection of the cooling line 121 with the battery cooling line 131.

That is, the coolant at a low temperature heat-exchanged with the refrigerant in the chiller 135 may be introduced into the battery 130 through the first branch line 143 which is opened by the first valve 140 to efficiently cool the battery 130.

Meanwhile, by preventing the coolant circulated through the battery cooling line 131 from being introduced into the radiator 122 by an operation of the first valve 140 when a temperature of the battery 130 is increased, the coolant heated through an operation of the heater 137 may be introduced into the battery 130 to rapidly increase a temperature of the battery 130.

In the present exemplary form, a second valve 150, which selectively connects the cooling line 121 and the battery cooling line 131, is provided on the cooling line 121 between the radiator 122 and the battery 130.

In addition, the cooling line 121 may include a second branch line 153 to connect the radiator 122 with the motor 125 and the electric component 126 through an operation of the second valve 150 between the electric component 126 and the chiller 135.

In this case, the second valve 150 may close the second branch line 153 when cooling down the battery 130 using the coolant cooled from the radiator 122.

Accordingly, the coolant cooled from the radiator 122 flows through the battery cooling line 131 connected with the cooling line 121 by an operation of the second valve 150 to cool the battery 130.

Meanwhile, the second valve 150 may close connection of the battery cooling line 131 with the cooling line 121, and may open the second branch line 153 when cooling down only the motor 125 and the electric component 126 using the coolant.

That is, the coolant cooled from the radiator 122 is introduced into the motor 125 and the electric unit 126 through the second branch line 153 to rapidly cool the motor 125 and the electric component 126.

Further, when the coolant heat-exchanged with the refrigerant cools the battery 130 or warms-up the battery 130 and increases a temperature of the battery 130, the second valve 150 may open the second branch line 153, and may close connection of the cooling line 121 with the battery cooling line 131.

In the present exemplary form, the first valve 140 and the second valve 150 may include a 3-way valve.

Meanwhile, the cooling line 121 may be provided with a reservoir tank 129 between the radiator 122 and the second valve 150. The reservoir tank 129 may store cooled coolant introduced from the radiator 122.

In the present exemplary form, each constituent element of the air-conditioning system 100, the cooling apparatus 200, and the battery cooling apparatus 300 may be operated by a control signal of a controller 600. The controller 600 may be a vehicle control apparatus (VCU).

To this end, the controller 600 may be provided as one or more processors operated by a set program, and the set program may perform each operation of a cooling method of an electric vehicle according to an exemplary form of the present disclosure.

In the present exemplary form, the battery cooling system may include a temperature sensor for detecting a temperature of the battery 130. The temperature of the battery 130 detected by the temperature sensor is transmitted to the controller 600. The temperature sensor may be provided in the battery management system 500 for managing a state of the battery 130.

In the present exemplary form, a state information (e.g., temperature) of the battery 130 may be detected by the battery management system 500 through a real time clock (RTC) built in the controller 600 in a periodic time interval, and the controller 600 may operate the battery cooling apparatus 300 based on the state information.

On/off state of the vehicle may be determined from a state of ignition switch 400.

Hereinafter, a cooling method of the electric vehicle according to an exemplary form of the present disclosure may be described in detail with reference to accompanying drawings.

Figure 3:
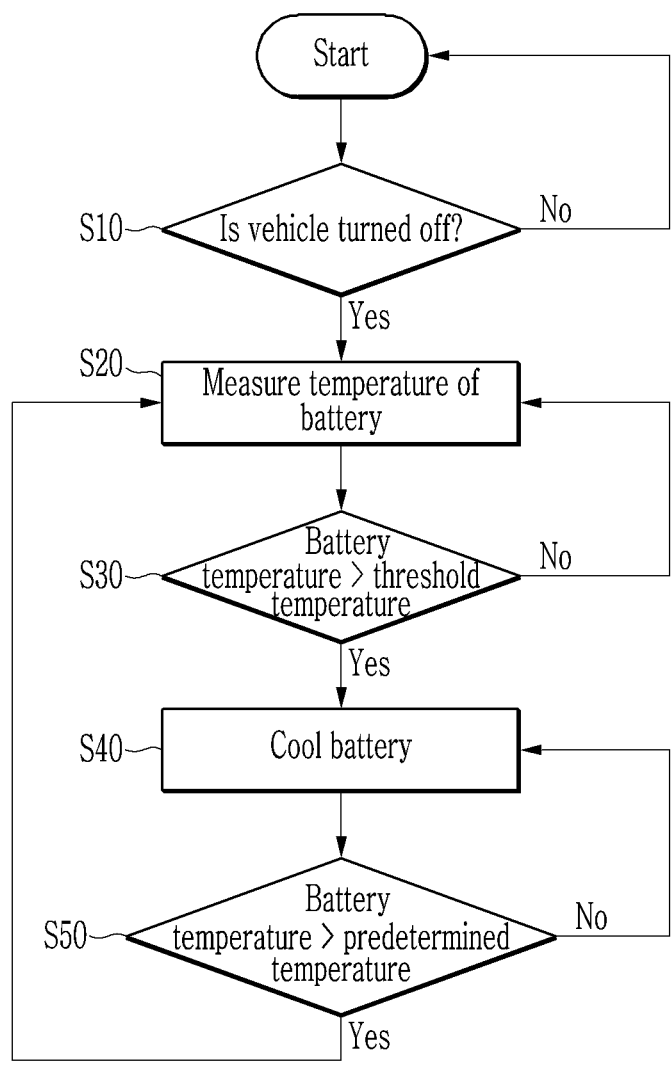
FIG. 3 is a flowchart illustrating a battery cooling method for a vehicle according to an exemplary form of the present disclosure.

FIG. 3 is a flowchart illustrating a battery cooling method for a vehicle according to an exemplary form of the present disclosure.

As shown in FIG. 3, the controller 600 determines whether the vehicle is turned off at step S10. The controller 600 may determine the turn-on/off state of the vehicle from a state of the ignition switch 400.

When the vehicle is turned-off, the controller 600 operated the battery management system 500 in a periodic time interval (e.g., 30 minutes), and the temperature of the battery 130 is periodically measured by the temperature sensor of the battery management system 500 at step S20.

When the temperature of the battery 130 is higher than a threshold temperature by comparing the temperature of the battery 130 to the threshold temperature at step S30, the controller 600 operates the air-conditioning system 100 and the battery cooling apparatus 300 to cool down the battery 130 at step S40. Herein, the threshold temperature may be set to 45 degrees Celsius.

Figure 4:
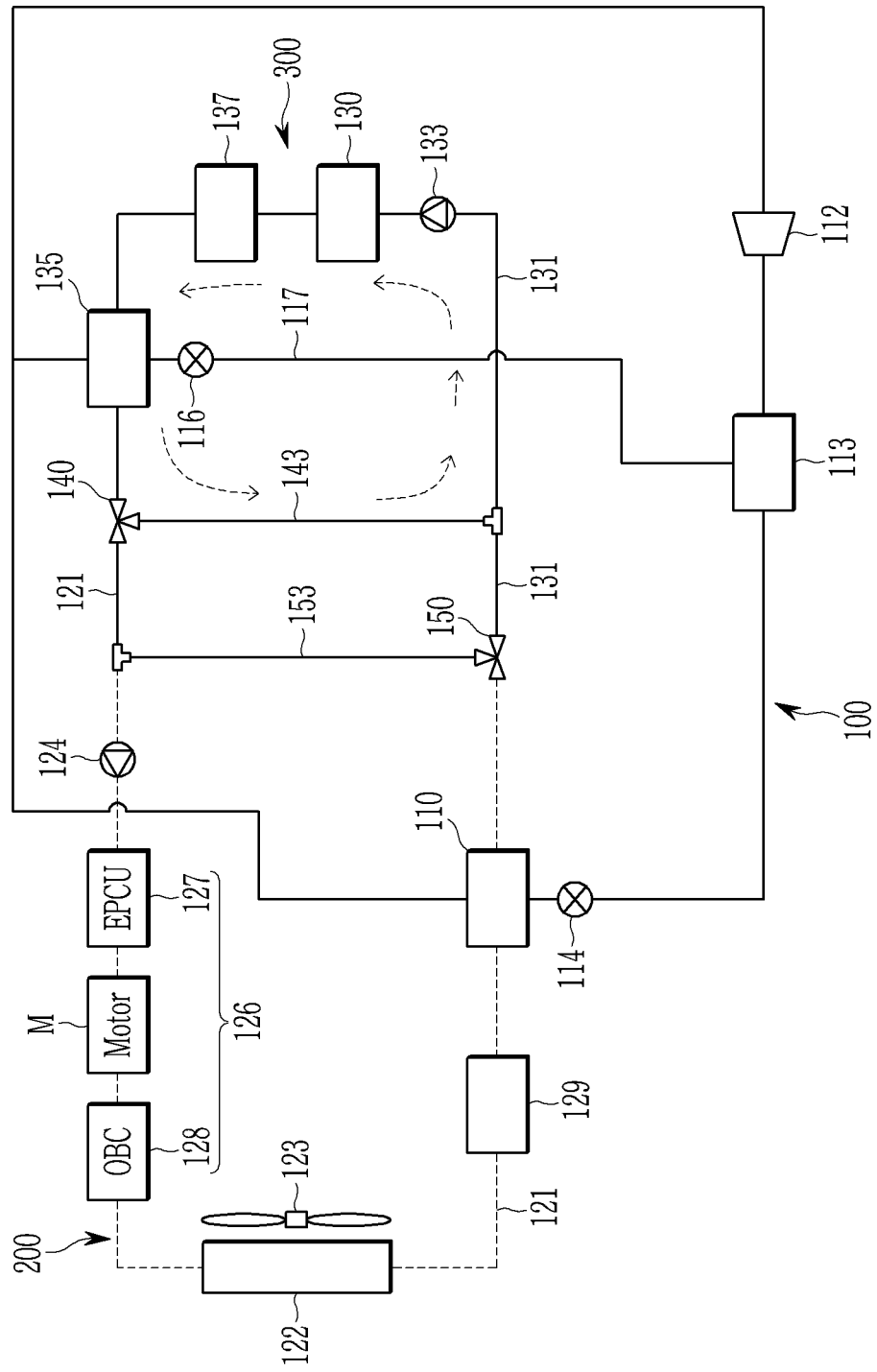
FIG. 4 is an operation state view illustrating a battery cooling system for a vehicle according to another exemplary form of the present disclosure.

The controller 600 operates the battery cooling apparatus 300 so that the battery cooling apparatus 300 becomes a closed loop. At this time, the controller 600 operates the first valve 140 to open the first branch line 143, and close the connection between the cooling line 121 and the battery cooling line 131. And the controller 600 operates the second valve 150 to open the second branch line 153, and close the connection between the cooling line 121 and the battery cooling line 131. Accordingly, the battery cooling line 131 is connected to the first branch line 143, and the battery cooling line 131 of the battery cooling apparatus 300 is not connected to the cooling line 121, therefore the battery cooling line 131 and the first branch line 143 form a closed loop (refer to FIG. 4).

The controller 600 operates the compressor 112, the condenser 113, and the chiller 135 of the air-conditioning system 100 to cool the coolant circulating in the battery cooling line 131 and the first branch line 143 through heat-exchanging between the refrigerant and the coolant.

At this time, the controller 600 operates the first electric water pump 124 to circulate the coolant through the battery cooling line 131 and the first branch line 143. The controller 600 may control the first electric water pump 124 at a speed of about 3,000 revolutions per minute (RPM).

Accordingly, the cooled coolant circulating in the battery cooling line 131 may cool the battery 130.

Thereafter, the controller 600 compares the temperature of the battery 130 to a predetermined temperature (e.g., 36 degrees Celsius) lower than the threshold temperature at step S50. When the temperature of the battery 130 is higher than the predetermined temperature, the controller 600 moves to step S40 and continuously cools the battery 130.

When the temperature of the battery 130 is lower than the predetermined temperature, the controller 600 stops the operation of the air-conditioning system 100 and the battery cooling apparatus 300, and moves to step S20.

According to the battery cooling system and the method for a vehicle according to the present disclosure as described above, when the vehicle is left for a long time in a hot weather and the temperature of the battery 130 is increased, the battery is cooled by operation of the battery cooling apparatus 300 and the air-conditioning system 100, thereby preventing the battery 130 from being degraded.

DESCRIPTION OF SYMBOLS

100: air-conditioning system
112: compressor
113: condenser
114: first expansion valve
115: evaporator
116: second expansion valve
117: connecting line
121: cooling line
122: radiator
123: cooling fan
124: first electric water pump
125: motor
126: electric component
129: reservoir tank
130: battery
131: battery cooling line
133: second electric water pump
135: chiller
137: heater
140: first valve
143: first branch line
150: second valve
153: second branch line
200: cooling apparatus
300: battery cooling apparatus While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. A battery cooling system comprising:
a battery cooling apparatus configured to:
selectively connected to a cooling apparatus, and
cool a battery by coolant flowing through the battery cooling apparatus;
a battery management system configured to measure a temperature of the battery in a periodic time interval after a vehicle is turned off; and
a controller configured to cool the battery through the battery cooling apparatus when the temperature of the batter is higher than a threshold temperature,
wherein:
the battery cooling apparatus includes:
a battery cooling line in which the coolant flows;
a chiller provided on the battery cooling line and configured to heat-exchange with the coolant selectively flowing therein so as to adjust a temperature of the coolant;
a first valve configured to selectively connect a cooling line of the cooling apparatus to the battery cooling line between a radiator and the battery;
a branch line connecting the chiller and the battery through the first valve; and
an electric water pump provided on the battery cooling line, and configured to pump the coolant flowing through the battery cooling line, and
wherein:
when the temperature of the battery is higher than the threshold temperature,
the controller is configured to:
operate the first valve to connect a battery connecting line and the branch line,
close the cooling line and the battery connecting line, and
operate the chiller and the electric water pump.

2. The battery cooling system of claim 1, wherein:
when the temperature of the battery is less than a predetermined temperature lower than the threshold temperature,
the controller is configured to stop an operation of the battery cooling apparatus, and
the battery management system is configured to measure the temperature of the battery in a periodic time interval.

3. A cooling method for a vehicle, the cooling method comprising:
measuring, by a battery management system, a temperature of a battery in a periodic time interval; and
cooling, by a controller, the battery through a battery cooling apparatus selectively connected to a cooling apparatus when the temperature of the battery measured by the battery management system is higher than a threshold temperature,
wherein:
when the temperature of the battery is higher than the threshold temperature,
connecting, by a valve controlled by the controller, a branch line and a battery connecting line of the battery cooling apparatus, where the branch line connects a chiller of the battery cooling apparatus and the battery,
closing, by the valve, a battery cooling line of the battery cooling apparatus and a cooling line of the cooling apparatus, and
operating the chiller to cool the battery.

4. The cooling method of claim 3, wherein:
when temperature of the battery is less than a predetermined temperature lower than the threshold temperature,
stopping, by the controller, an operation of the battery cooling apparatus, and
measuring, by the battery management system, the temperature of the battery in a periodic time interval.

* * * * *